7/3/84 XR 4,457,177

United States Patent [19]

Van Heelsbergen

[11] Patent Number: 4,457,177

[45] Date of Patent: Jul. 3, 1984

[54] ULTRASONIC TRANSMITTER

[75] Inventor: Teunis R. Van Heelsbergen, Eindhoven, Netherlands

[73] Assignee: U.S. Philips Corporation, New York, N.Y.

[21] Appl. No.: 460,321

[22] Filed: Jan. 24, 1983

[30] Foreign Application Priority Data

Feb. 9, 1982 [NL] Netherlands ........................ 8200478

[51] Int. Cl.³ ........................................ G01N 29/04

[52] U.S. Cl. .................................... 73/626; 73/641; 73/642

[58] Field of Search ................ 73/621, 625, 626, 628, 73/632, 641, 642

[56] References Cited

U.S. PATENT DOCUMENTS 3,166,731 1/1965 Joy ........................................ 73/626
4,180,790 12/1979 Thomas ........................................ 73/626
4,410,910 10/1983 Andes ........................................ 73/626

*Primary Examiner*—James J. Gill
*Attorney, Agent, or Firm*—Jack E. Haken

[57] ABSTRACT

The transmitter comprises an array of electro-acoustic transducers (1), each of which is connected to an oscillator circuit (9) which has a start input (11). The start inputs (11) successively receive start signals from a start signal generator (13) which comprises a number of comparators (15), each of which comprises a first input (17) and a second input (19). The first inputs (17) are together connected to an output of a sawtooth generator (21), the second input (19) of each comparator (15) are connected to a direct voltage source (23). A direct voltage source (23) is provided for each start signal to be successively generated at least some of the direct voltage sources being controllable in common.

8 Claims, 6 Drawing Figures

ULTRASONIC TRANSMITTER

The invention relates to an ultrasonic transmitter for the examination of an object, comprising an array of electro-acoustic transducers and means for activating the transducers in different phases, said means comprising a number of oscillator circuits which each has a start input, and also comprising a start signal generator which serves to supply start signals successively to the start inputs of the oscillator circuits.

A transmitter of this kind is known from German Patent Specification No. 1,698,149. The start pulse generator of the known transmitter comprises a number of monostable multivibrators, each of which is associated with one of the oscillator circuits. The trigger inputs of all multivibrators are together connected to a pulse generator and the duration of the pulse generated by each multivibrator can be individually controlled by means of an adjustable voltage divider. A detector which is connected to the output of the multivibrator detects the trailing edge of the pulse and in response thereto it generates a start pulse which is applied to the start input of the relevant oscillator circuit. Because the trailing edges of different multivibrator pulses occur at different instants, the oscillator circuits are also activated at different instants, so that the transducers are activated in different phases. The direction of a beam of ultrasonic energy emitted by the transducer array is determined by the phase differences. Once the voltage dividers associated with the various multivibrators have been adjusted, the beam direction can be varied by variation of a control voltage applied to them. The ratios between the voltages applied to the various multivibrators, and hence also the ratios between the durations of the pulses generated, however, are fixed by the setting of the voltage dividers.

It is an object of the invention to provide a transmitter of the kind set forth in which the delay times of the activation voltages applied to the various transducers can be varied in more than one way by variation of one or more control voltages.

To this end, the transmitter in accordance with the invention is characterized in that the start signal generator comprises a number of comparators, each of which has a first input and a second input, all first inputs being together connected to an output of a sawtooth generator, the second input of each comparator being connected to a direct voltage source, a direct voltage source being provided for each start signal to be successively generated, at least some of the direct voltage sources being controllable in common.

A comparator in the transmitter in accordance with the invention supplies a start signal to the associated oscillator circuit when the sawtooth voltage equals the direct voltage generated by the associated direct voltage source. The various delay times can be varied by variation of the sawtooth voltage and by control of the direct voltage sources. The sawtooth voltage may be or may not be linearly time dependent.

An embodiment of the invention in which the controllability in common of the or some of the voltage sources is achieved in a reliable and inexpensive manner is characterized in that each direct voltage source comprises an amplifier circuit whose gain for a voltage applied to a first input thereof is adjusted to a predetermined value, the first inputs of the amplifier circuits of the direct voltage sources which can be controlled in common being together connected to a first controllable voltage generator.

A further embodiment in which not only the beam direction can be controlled but also the beam focus is characterized in that at least some of the amplifier circuits are constructed as adder circuits, for which purpose they have a second input, the gain for the voltage applied to the second input also being adjusted to a predetermined value, the second inputs being connected to a second controllable voltage generator.

The invention will be described in detail hereinafter with reference to the drawings. Therein:

Figure 1:
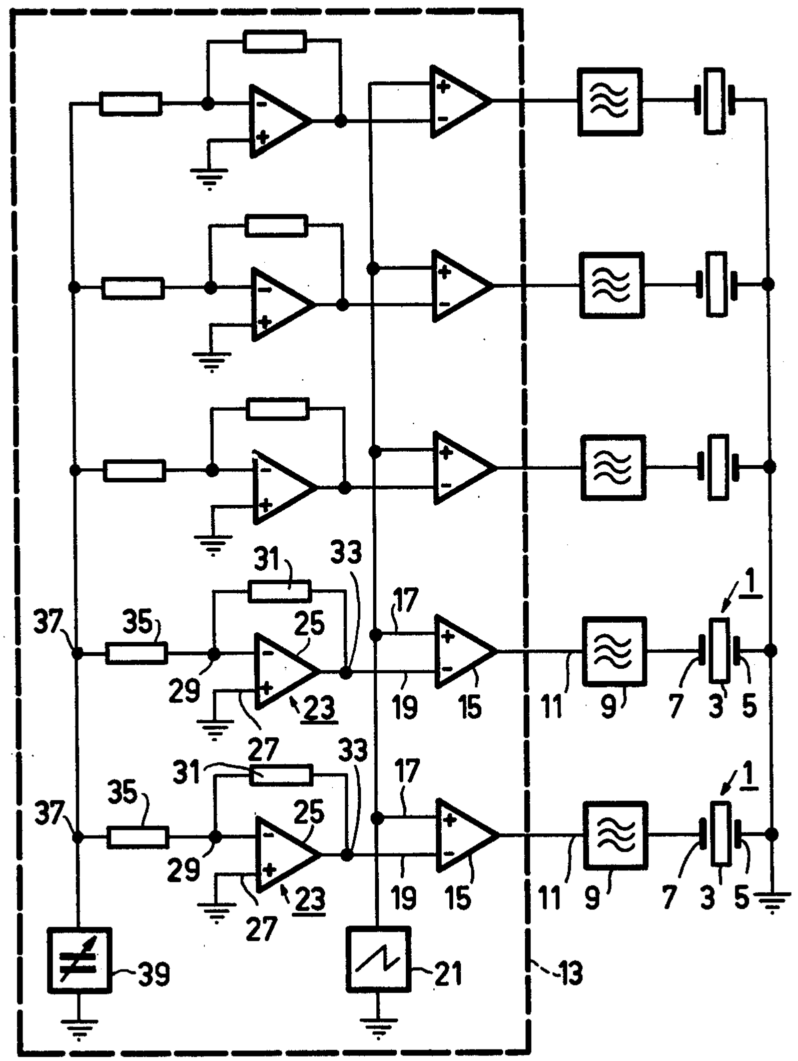
FIG. 1 is a schematic diagram of a first, ultrasonic transmitter in accordance with the invention.
Figure 3:
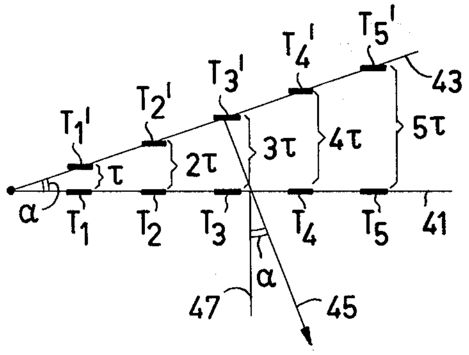

FIG. 3 diagrammatically shows the operation of the transmitter shown in FIG. 1.

Figure 4:
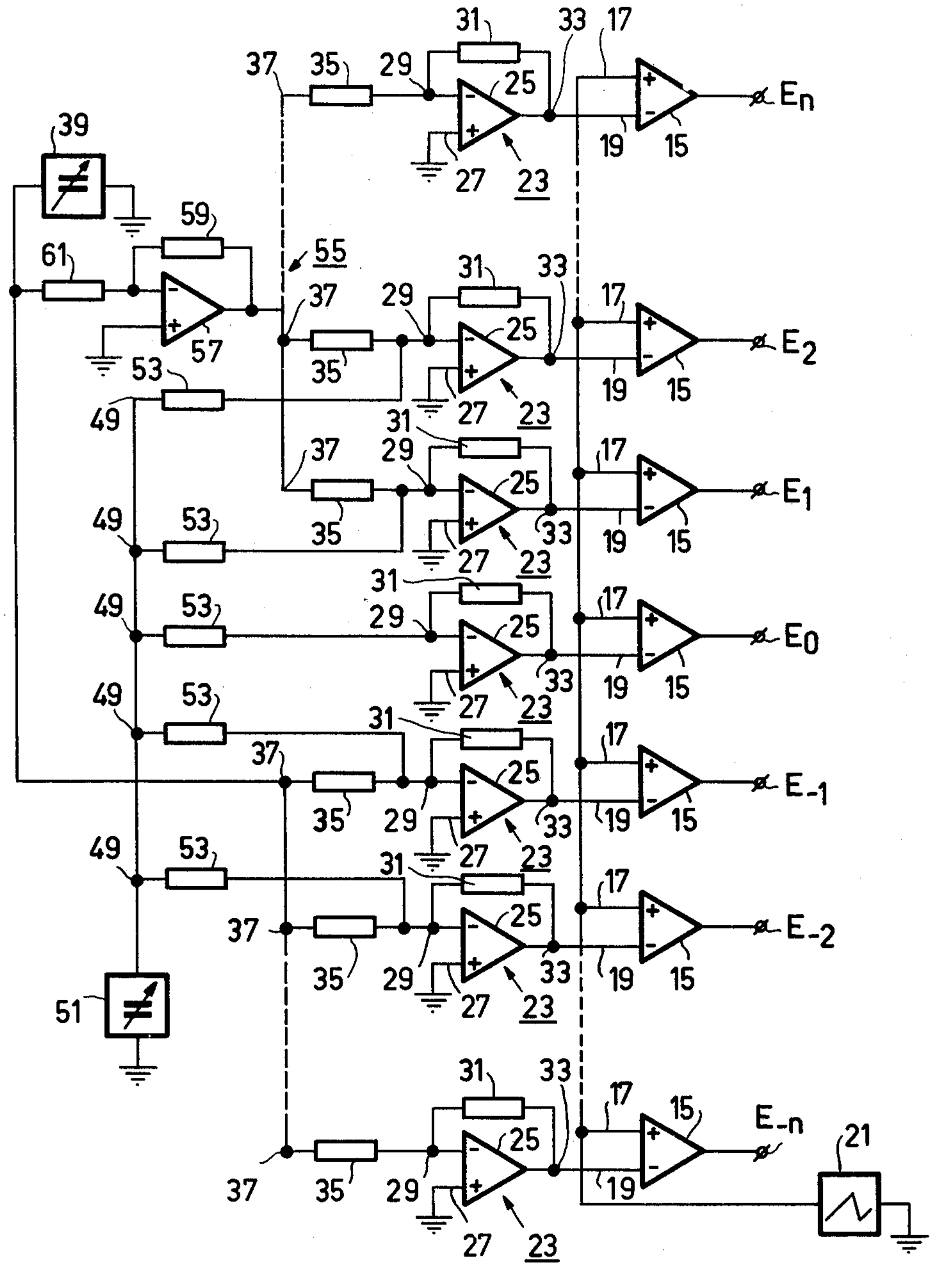

FIG. 4 is a schematic diagram of a signal generator for a second ultrasonic transmitter in accordance with the invention.

Figure 5:
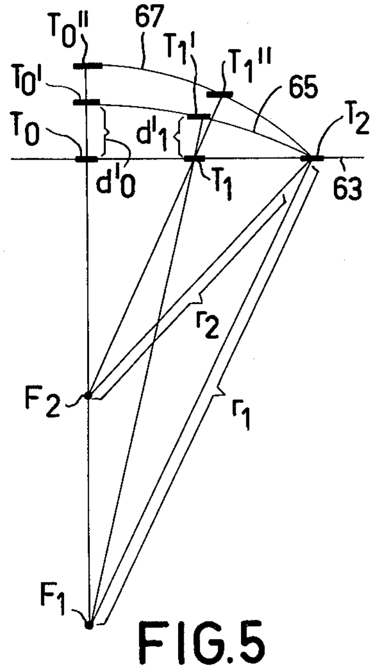
Figure 6:
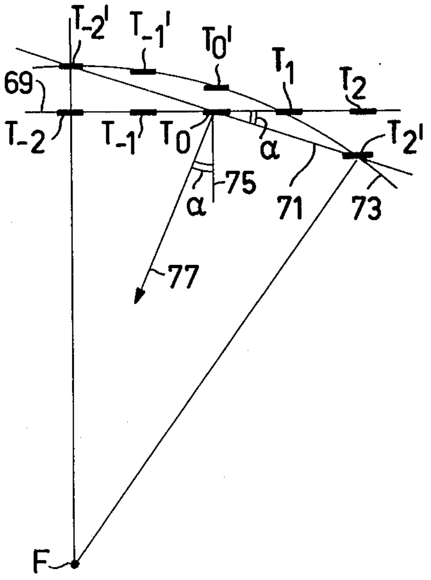

FIG. 5 diagrammatically illustrates a detail of the operation of the transmitter shown in FIG. 4, and FIG. 6 is a further diagrammatic illustration of the operation of the transmitter shown in FIG. 4.

FIG. 1 is a schematic diagram of an ultrasonic transmitter for the examination of an object, for example a part of the human body. The transmitter comprises an array of electro-acoustic transducers 1, each of which consists of a plate 3 of piezo-electric material with a first electrode 5 and a second electrode 7. This very simple embodiment comprises five transducers 1 which are arranged in a row at the same distance from one another. The number of transducers will generally be substantially larger in practice. All first electrodes 5 are grounded and the second electrode 7 of each transducer 1 is connected to a known oscillator circuit 9 which is associated with the relevant transducer and which has a start input 11.

The start inputs 11 of the oscillator circuits 9 are connected to outputs of a start signal generator 13 which serves to apply start signals successively to the start inputs of the various oscillator circuits. The start signals are generated by comparators 15, one of which is associated with each oscillator circuit 9. Each comparator 15 has a first input 17 and a second input 19. All first inputs are together connected to the output of a sawtooth generator 21. The second input 19 of each comparator 15 is connected to a respective direct voltage source 23 which comprises an amplifier circuit which consists of an operational amplifier 25 whose positive input 17 is grounded and whose negative input 29 is connected to the output 33 via a first resistor 31 and, via a second resistor 35, to a common input terminal 37. The input terminal 37 is connected to the output of a controllable direct voltage generator 39.

Figure 2:
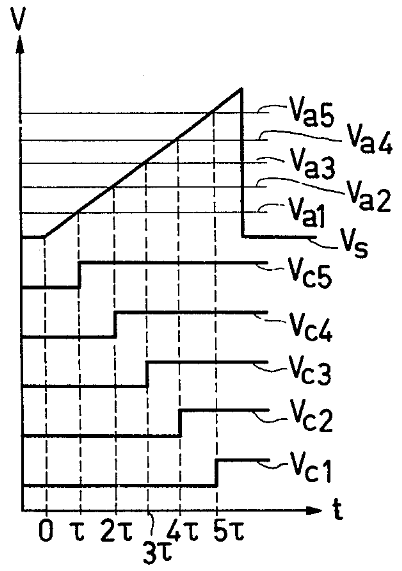
FIG. 2 is a diagram illustrating the variation in time of a number of voltages in the transmitter shown in FIG. 1.

The diagram of FIG. 2 serves to illustrate the operation of the start signal generator 13 described. The diagram shows the variation of a number of voltages V during one period of the sawtooth generator 21, the time t being plotted along the horizontal axis. The voltage generated by the sawtooth generator 21 is denoted by $V_S$. In the present embodiment the sawtooth generator 21 serves to generate a linear sawtooth voltage. This means that the rising part of $V_S$ varies according to a straight line. Other sawtooth voltages where the rising part of $V_s$ varies according to a curved line are also feasible, if desired.

The voltages generated by the five direct voltage sources 23 are indicated as $V_{a1}$ to $V_{a5}$, $V_{a1}$ being generated by the lowermost direct voltage source in FIG. 1, $V_{a2}$ by the second source from the bottom etc. The value of each of the direct voltages depends on the one hand on the voltage supplied by the direct voltage generator 39 and on the other hand on the ratio between the resistors 31 and 35. In the embodiment shown, for example, the resistor 31 may have the same value R for all direct voltage sources 23, whilst the resistors 35 successively have the values 5R, 4R, 3R, 2R and R.

At the instant at which the sawtooth voltage $V_s$ equals the direct voltage $V_{ai}$ of one of the direct voltage sources 23, the output voltage $V_{ci}$ of the associated comparator 15 becomes high. This output voltage is applied to the start input 11 of the associated oscillator circuit 9 as a start signal, so that the associated transducer 1 is activated. When the sawtooth voltage $V_s$ is linear and the difference between two successive direct voltages $V_{ai}$ and $V_{ai+1}$ is always the same, like in the present embodiment, the period of time expiring between two successive start signals is always also the same. This period is denoted as $\tau$ in FIG. 2. If the sawtooth voltage $V_s$ starts to rise at the instant $t=0$, the first start signal $V_{c1}$ appears at $t=\tau$, the second start signal $V_{c2}$ at $t=2\tau$, etc.

The known consequence of such activation of the transducers with different delays is that an array of transducers which constitutes a straight line emits a beam of ultrasonic energy whose direction is at an angle other than 90° to this line. This is diagrammatically shown again in FIG. 3. The five transducers are denoted therein by the references $T_1$ to $T_5$. They are situated on a straight line 41 at equal distances from one another. When a transducer $T_i$ is activated at the instant $t=i\tau$, the result is the same as if a transducer $T'_1$ which is situated at a distance $i\tau c$ behind the transducer $T_i$ were activated at the instant $t=0$. (c is the velocity of sound in the medium in which the transducers are situated, so that $i\tau c$ is the distance travelled by an ultrasonic wave during the period $i\tau$.) The successively activated transducers $T_1$, $T_2$ . . . $T_5$ on the line 41 thus act as simultaneously activated virtual transducers $T'_1$, $T'_2$, . . . $T'_5$ which are situated on a line 43 which is at an angle $\alpha$ to the line 41. The direction of the beam of ultrasonic energy which is emitted by these transducers and which is indicated by an arrow 45, therefore is at an angle $\alpha$ to the normal 47 to the line 41. Variation of the voltage generated by the direct voltage generator 39 causes a proportional variation of all direct voltages $V_{ai}$, so that the delay times are also varied; however, their ratios remain the same. The angle $\alpha$ which determines the direction of the emitted beam can thus be controlled. The same effect is obtained by variation of the slope of the sawtooth voltage $V_s$. The ratios between the various delay times can be varied by making the sawtooth generator 21 generate a non-linear sawtooth voltage $V_s$ instead of a linear sawtooth voltage.

It is possible to construct the direct voltage amplifier circuits as adder circuits so that they can be connected to two or more controllable direct voltage generators, so that the possibilities for control of the delay times $\tau$ are substantially increased. The signal generator may also be adapted so that the central transducer of the array is always activated at the instant $t=0$, while the transducers which are situated to one side of the centre are activated sooner and the transducers which are situated to the other side of the centre are activated later. An example of a signal generator incorporating both these possibilities is shown in FIG. 4. The parts which correspond to those of the signal generator 13 are denoted by reference numerals which correspond to FIG. 1. The signal generator which is shown in FIG. 4 may replace the signal generator 13 of FIG. 1, its outputs being connected to the corresponding inputs 11 of the oscillator circuits 9. These outputs are successively denoted by $E_{-n}$, . . . $E_{-1}$, $E_o$, $E_1$, . . . $E_n$ from the bottom upwards in FIG. 4. The associated transducers, which are not shown in FIG. 4, are regularly distributed on a straight or curved line, the central output $E_o$ controlling the oscillator circuit of the central transducer, the outputs $E_{-1}$, $E_{-2}$, . . . controlling the oscillator circuits of the transducers which are successively situated to one side of the centre of the line, while the outputs $E_1$, $E_2$, . . . control those of the transducers successively situated to the other side of the centre.

Each of the amplifier circuits 23, with the exception of the circuits which are connected to the central output $E_o$ and the two extreme outputs $E_{-n}$ and $E_n$, is constructed as an adder circuit; for this purpose it has two inputs. The first of these inputs is the input terminal 37 which has already been described with reference to FIG. 1 and which is connected to the direct voltage generator 39. The second input terminal 49 is connected to a second controllable direct voltage generator 51. Between the second input 49 and the negative input of the operational amplifier 25 there is connected a third resistor 53. The two extreme amplifier circuits 23 do not have a second input 49. The central amplifier circuit 23 effectively has only the second input 49. In this embodiment the sawtooth generator 21 serves to generate a linear sawtooth voltage whose mean value equals approximately zero. This means that this voltage starts with a negative value, equals zero approximately halfway through the period and subsequently assumes a positive value.

Ignoring the second inputs 49 for the time being, it will be seen that the amplifier circuits 23 which are connected to the outputs $E_{-1}$ to $E_{-n}$ are connected to the first direct voltage generator 39 in the same way as the amplifier circuits of the start signal generator 13 of FIG. 1. The amplifier circuit 23 which is connected to the output $E_o$ has a floating negative input, so that its output voltage equals zero. The first inputs 37 of the amplifier circuits 23 which are connected to the outputs $E_1$ to $E_n$ are connected to the first direct voltage generator 39 via an inverting circuit 55. The inverting circuit 55 is formed by an operational amplifier 57 whose positive input is grounded whilst its negative input is connected to the output via a resistor 59 and to the first direct voltage generator 39 via a resistor 61. The values of the resistors 59 and 61 are equal.

The value of the first resistors 31 of the amplifier circuits 23 is the same for all these circuits. The value of the second resistors 35 increases as the amplifier circuits are associated with an input $E_i$ whose absolute value of the sequence number i is higher. Consequently, start signals successively appear on the outputs $E_n$, $E_{n-1}$, . . . $E_o$, . . . $E_{-n+1}$, $E_{-n}$. When the voltages of the sawtooth generator 21 and the direct voltage generator 39, and the values of the resistors 31 and 35 are chosen so that the time interval between two successive start signals always equals $\tau$, the start signals successively appear at the instants $-n\tau$, $-(n-1)\tau$, . . . , 0, . . . , $(n-1)\tau$, $n\tau$. The phase shift of the activation signals for the transducers is, therefore, symmetrical with respect to the central transducer. In comparison with the situation shown in FIG. 3, this means that the line 43 on which the virtual transducers are arranged intersects the centre of the line 41 on which the actual transducers are arranged. This offers the advantage that when $\tau$ is varied (and hence $\alpha$ is also varied), the line 43 is not rotated about one of its ends but about its centre, so that the centre of the emitted beam always originates from the same point.

For the sake of simplicity, the effect of the voltage applied to the second inputs 49 of the direct voltage amplifier circuits 23 will be first described without taking into account the described effect of the voltage applied to the first inputs 29. To this end it may be assumed that all first inputs 29 are floating, so that all start signals would appear at the same instant $t=0$.

The amplification of the voltage which is applied to the second inputs and which originates from the second direct voltage generator 51 is determined by the ratio of the value of the first resistor 31 to that of the third resistor 53. Because all first resistors 31 are equal as assumed before, the amplifications are inversely proportional to the values of the third resistors 53. The amplified voltage is again compared in the comparator 15 with the value of the sawtooth voltage from the sawtooth generator 21; when both voltages are equal, a start signal is produced. If the values of the third resistors 53 are chosen to be highest for the amplifier circuit 23 associated with the central output $E_o$, and to decrease as the absolute value of the sequence number i of the output $E_i$ is higher, a start signal will appear on the extreme outputs $E_n$ and $E_{-n}$ (whose amplifier circuits do not have a second input 49) at the instant $t=0$ and start signals will appear on the outputs which are situated further inwards at successive, later instants, the last start signal appearing on the central output $E_o$. When the transducers are arranged in a straight line, a focussed beam of ultrasonic energy is then emitted instead of a parallel beam.

FIG. 5 diagrammatically illustrates how such focussing is achieved. This Figure shows three transducers $T_0$, $T_1$, $T_2$ of an array of transducers, $T_0$ being the central transducer of the array, $T_1$ being an intermediate transducer while $T_2$ is the last transducer. The transducers are situated on a straight line 63. The central transducer $T_0$ is activated last, so that it acts as a virtual transducer $T'_0$ which is situated at a distance $D'_0$ behind the transducer $T_0$. The transducer $T_1$, being activated sooner, acts as a virtual transducer $T'_1$ which is situated at a distance $d'_1$ behind $T_1$, and the last transducer $T_2$ is activated without delay. The magnitude of the distances $d'_0$ and $d'_1$ depends on the voltages of the second direct voltage generator 51 and the sawtooth generator 21 and also on the values of the third resistors 53. These resistors may be chosen so that the virtual transducers $T'_0$ and $T'_1$ are situated on a first arc of circle 65 whose center is denoted by the reference $F_1$. The ultrasonic waves emitted by these virtual transducers are then in phase at the point $F_1$ and the emitted beam of ultrasonic energy is focussed at this point.

When the output voltage of the second direct voltage generator 51 is increased, all delay times increase proportionally and hence also all distances $d'_0$, $d'_1$. The central transducer $T_0$ then acts as a virtual transducer $T''_0$ at a distance $d''_0$ behind $T_0$ and the transducer $T_1$ acts as a virtual transducer $T''_1$ at a distance $d''_1$ behind $T_1$. For the sake of clarity, the distances $d''_0$ and $d''_1$ are not shown in FIG. 5. The last transducer $T_2$ is still activated without delay. The transducers $T''_0$, $T''_1$, $T''_2$ are situated on a second arc of circle 67 having a center $F_2$, the emitted beam being focussed at $F_2$.

The Figure shows that the virtual transducers $T'_1$ and $T''_1$ which correspond to the intermediate transducer $T_1$ are situated exactly on the arcs of circle 65 and 67, respectively, only if they are shifted not only straight backwards over a given distance with respect to the transducer $T_1$, but also to the right over a smaller distance. Obviously, the virtual transducer in reality is always situated straight behind the actual transducer, so that the virtual transducer has undergone a small lateral shift with respect to the ideal position shown in FIG. 5. However, if the radii $r_1$ and $r_2$ of the arcs of circle 67 and 65, respectively, are large enough, the error then arising will be negligibly small. It has been found in practice that focussing is very satisfactory when the radius is chosen to be larger than approximately five times the distance between the central and the last transducer.

When the transducers are situated on a curved line, if desired, the third resistors 53 may also be chosen so that the ultrasonic energy emitted by the transducers together forms a flat wave front. Focussing introduced by the configuration of the transducers can thus be eliminated.

As has already been noted, the amplifier circuits 23 shown in FIG. 4 are constructed as adder circuits. This means that the voltages applied to their inputs 37 and 49 are summed after an amplification which is determined by the ratio of the resistors 35 and 53 on the one hand to the resistor 31 on the other hand. It has been explained that the voltage applied to the first inputs 37 determines the beam direction, whilst the voltage applied to the second input 49 determines the focussing. Because these two voltages are summed, the start signal generator shown in FIG. 4 enables independent control of the beam direction as well as of the focal distance to be obtained. The result of the combination of these two possibilities is diagrammatically shown in FIG. 6 for an array of five transducers $T_{-2}$, $T_{-1}$, $T_0$, $T_1$, $T_2$ which are situated on a straight line 69. The voltage applied to the first inputs 37 results in virtual transducers which are situated on a straight line 71 which is at an angle to the line 69. The voltage applied to the second inputs 49 shifts the positions of the virtual transducers so that they are situated on an arc of circle 73. The ultimate positions of the virtual transducers are again denoted by indices in the manner used in FIGS. 3 and 5. The virtual transducer corresponding to $T_1$ happens to coincide with $T_1$. This means that the two voltages applied to the two inputs 37, 49 of the relevant adder circuit 23 cancel one another after amplification and addition. The ultrasonic beam emitted by these virtual transducers is at an angle $\alpha$ to the normal 75 to the line 69 (denoted by the arrow 77) and is focussed at a point F.

There are many alternatives to the described embodiments. For example, the direct voltage generators 39, 51 may be replaced, if desired, by alternating voltage generators. The amplifier circuits 23 need not be direct voltage amplifier circuits in that case. However, it will then be necessary to connect a rectifier to the output 33 of each of these amplifier circuits.

It is alternatively possible to derive the negative voltage for the amplifier circuits 23 which are connected to the outputs $E_1$ to $E_n$ of the start signal generator shown in FIG. 4 from a third, negative direct voltage generator. The inverting circuit 55 which is connected to the first direct voltage generator 39 can then be dispensed with.

What is claimed is:

1. An ultrasonic transmitter comprising:
- a plurality of oscillator circuits, each oscillator circuit having a start input and an output;
- a like plurality of electro-acoustic transducers, each transducer being connected to the output of a corresponding oscillator for activation thereby;
- a like plurality of comparators, each comparator having a first input, a second input, and an output; the output of each comparator being connected to the start input of a corresponding oscillator;
- generator means for producing a saw-tooth voltage at an output which is connected to the first inputs of all of the comparators; and
- voltage source means which supply controllable DC voltages to the second input of each of the comparators, the DC voltages supplied to each of one or more groups of at least two of the comparators being controllable by a common control.

2. A transmitter as claimed in claim 1, wherein the voltage source means comprise a plurality of voltage amplifiers, each amplifier having a predetermined gain and having an output connected to the second input of a corresponding comparator; and
- one or more first controllable voltage generators, connected to first inputs of corresponding amplifiers, at least one first controllable voltage generator having an output connected to parallel first inputs of a group of amplifiers whose output voltages are subject to common control.

3. A transmitter as claimed in claim 2, wherein one or more of the amplifiers comprise adder means which sum input voltages so that the output voltage of the amplifier is a function of the sum of a first input voltage and a second input voltage and further comprising a second controllable voltage generator connected to supply second input voltages to the adder means.

4. A transmitter as claimed in claim 3, wherein the controllable voltage generators generate DC voltage and the amplifiers comprise DC voltage amplifiers.

5. A transmitter as claimed in claim 2, wherein the controllable voltage generators generate DC voltage and the amplifiers comprise DC voltage amplifiers.

6. A transmitter as claimed in claim 1, wherein:
- the transducers are disposed along a line;
- the generator means produces a linear sawtooth voltage having a mean value approximately equal to zero; and
- the voltage source means function to supply a positive DC voltage to comparators which are associated with transducers on a first side of the center of the line and function to supply a negative DC voltage to the comparators which are associated with transducers on the opposite side of the center of the line.

7. The transmitter of claim 6 wherein the transducers are disposed along a straight line.

8. The transmitter of claim 6 wherein the transducers are disposed along a curved line.

* * * * *